(12) United States Patent
Kawakatsu

(10) Patent No.: US 7,719,663 B2
(45) Date of Patent: May 18, 2010

(54) HETERODYNE LASER DOPPLER PROBE AND MEASUREMENT SYSTEM USING THE SAME

(75) Inventor: Hideki Kawakatsu, Setagaya-ku (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 123 days.

(21) Appl. No.: 11/817,357

(22) PCT Filed: Mar. 2, 2006

(86) PCT No.: PCT/JP2006/303934

§ 371 (c)(1),
(2), (4) Date: Mar. 3, 2008

(87) PCT Pub. No.: WO2006/093209

PCT Pub. Date: Sep. 8, 2006

(65) Prior Publication Data

US 2009/0219506 A1  Sep. 3, 2009

(30) Foreign Application Priority Data

Mar. 2, 2005  (JP) .............................. 2005-056754

(51) Int. Cl.
*G01P 3/36* (2006.01)
(52) U.S. Cl. .................. 356/28.5; 356/5.15; 250/306
(58) Field of Classification Search ............... 356/5.01, 356/5.15, 28, 28.5; 250/306, 307
See application file for complete search history.

(56) References Cited

U.S. PATENT DOCUMENTS 5,608,166 A * 3/1997 Monchalin et al. ............ 73/657
7,220,962 B2 * 5/2007 Kawakatsu ................. 250/306
2007/0158554 A1 * 7/2007 Kobayashi et al. .......... 250/309

FOREIGN PATENT DOCUMENTS

| JP | 04-102008 | 4/1992 |
|---|---|---|
| JP | 4-136743 | 5/1992 |
| JP | 06-185977 | 7/1994 |
| JP | 07-012545 | 1/1995 |
| JP | 07-225975 | 8/1995 |
| JP | 10-142241 | 5/1998 |
| JP | 2003-114182 | 4/2003 |
| JP | 2004-125540 | 4/2004 |
| WO | WO 2005015570 A1 * | 2/2005 |

OTHER PUBLICATIONS

Oshio, Takanori et al., "Atomic Force Microscope Using an Optical Fiber Heterodyne Interferometer Free from External Disturbances", Japanese Journal of Applied Physics, vol. 32, part 1, No. 6B, pp. 2994-2998, 1993.

* cited by examiner

*Primary Examiner*—Isam Alsomiri
(74) *Attorney, Agent, or Firm*—Oblon, Spivak, McClelland, Maier & Neustadt, L.L.P.

(57) ABSTRACT

A heterodyne laser having a first optical path for guiding excitation light and a second optical path for guiding measurement light. The heterodyne laser includes an optical probe body for optically coupling and structurally combining the first optical path and the second optical path, and includes a reflection mirror, a beam splitter, a focal lens and a ¼ wavelength plate. The excitation light from the first optical path is introduced through the reflection mirror, the beam splitter and the focal lens into a measurement object.

9 Claims, 7 Drawing Sheets (a)

(b)

(a)

(b)

HETERODYNE LASER DOPPLER PROBE AND MEASUREMENT SYSTEM USING THE SAME

TECHNICAL FIELD

The present invention relates to a high-efficiency photoexcitation laser Doppler probe, and more specifically, to a heterodyne laser Doppler probe and a measurement system using the same.

BACKGROUND ART

The conventional type of optical probe having a photoexciting function and introducing light into the probe by an optical fiber, has transmitted excitation light and measurement light by the single optical fiber (refer to PATENT DOCUMENT 1).

[PATENT DOCUMENT 1] Japanese Unexamined Patent Application Publication No. 2003-114182

DISCLOSURE OF INVENTION

However, when wavelengths are much different between the excitation light and the measurement light, the transmission efficiency of either one of the excitation light and measurement light compares unfavorably with the other, in the optical fiber designed for a specified frequency. Also, when light incidence on an optical fiber and light irradiation to a measurement object are performed using the identical lens, either one of the excitation light and measurement light is not sufficiently focused along chromatic aberration. This has incurred a reduction in the intensity of a measurement signal or a decrease of the photoexciting efficiency.

Furthermore, if the irradiation position of a light beam for measurement and the irradiation position of a light beam for excitation can be deviated from each other, it is possible to enhance the excitation and to improve the measurement sensitivity, but this has not been achieved by conventional photoexcitation laser Doppler probes.

In view of the above-described circumstances, the present invention aims to provide a heterodyne laser Doppler probe capable of realizing the compatibility between its photoexcitation efficiency and speed measurement efficiency, and also a measurement system using the same.

To achieve the above-described object, the present invention provides the following:

[1] A heterodyne laser Doppler probe includes a first optical path for guiding excitation light, and a second optical path for guiding measurement light, wherein the excitation light is emitted from the first optical path, and introduced into a focal lens in an optical probe to thereby be focused on a measurement object, and wherein the measurement light is introduced into the focal lens through a ¼ wavelength plate in the optical probe to thereby be focused on the measurement object, and the measurement light reflected by the measurement object is returned to the second optical path through the focal lens and the ¼ wavelength plate.

[2] In the heterodyne laser Doppler probe set forth in the above [1], a reflection mirror and a beam splitter that receive excitation light guided by the first optical path are arranged, and the measurement light that has been received by the ¼ wavelength plate is received by the beam splitter. Light emitted from the beam splitter is introduced into the focal lens, and the measurement light that has been returned to the focal lens is returned to the second optical path through the beam splitter and the ¼ wavelength plate.

[3] In the heterodyne laser Doppler probe set forth in the above [1], the first optical path is a first optical fiber, and the second optical path is a second optical fiber. The excitation light from the first optical fiber is introduced through a first collimator lens into the focal lens, after having been emitted from the first optical fiber. The measurement light from the second optical fiber is introduced through a second collimator lens into the focal lens, after having been emitted from the second optical fiber.

[4] In the heterodyne laser Doppler probe set forth in the above [1], [2] or [3], the measurement object is a cantilever, and the speed of the cantilever is measured.

[5] The heterodyne laser Doppler probe set forth in any one of the above [1] to [4] further includes an adjustment mechanism capable of displacing the beam splitter, whereby a focal position of the excitation light on the measurement object is adjusted with respect to a focal position of the measurement light on the measurement object.

[6] The heterodyne laser Doppler probe set forth in any one of the above [1] to [4] further includes an adjustment mechanism capable of displacing the reflection mirror, whereby a focal position of the excitation light on the measurement object is adjusted with respect to a focal position of the measurement light on the measurement object.

[7] The heterodyne laser Doppler probe set forth in any one of the above [1] to [4] further includes an adjustment mechanism capable of displacing the beam splitter and the reflection mirror, whereby a focal position of the excitation light on the measurement object is adjusted with respect to a focal position of the measurement light on the measurement object.

[8] A measurement system using the heterodyne laser Doppler probe set forth in any one of the above [1] to [7]. In the measurement system, the measurement light that has been emitted from the second optical path and reflected by the measurement object is reflected by the beamsplitter, and introduces the reflected light to a measurement portion.

[9] In the measurement system using the heterodyne laser Doppler probe set forth in the above [8], the excitation light and the measurement light are introduced into the optical probe in a superimposed manner, by mirrors for optical path adjustment arranged in the first and second optical paths.

[10] In the measurement system using the heterodyne laser Doppler probe set forth in the above [8] or [9], a glass barrier is arranged in each of the first and second optical paths, whereby the optical probe is allowed to be disposed in a vacuum, a gas and a liquid, and a light source or an optical path adjustment mechanism is allowed to be disposed in the air.

BEST MODE FOR CARRYING OUT THE INVENTION

The heterodyne laser Doppler probe according to the present invention introduces excitation light for photoexcitation from a first optical path to an optical probe and measurement light for heterodyne laser Doppler measurement from a second optical path to the optical probe. After emission from the first optical path, the excitation light is introduced through a reflection mirror and a beam splitter into a focal lens, and then into a measurement object (excitation object). On the other hand, the measurement light for heterodyne laser Doppler measurement is emitted from the second optical path, and passes through a ¼ wavelength plate. Here, linearly polarized light is converted into a circularly polarized light, and introduced through the beam splitter and the focal lens into the measurement object (excitation object). The measurement light (signal light) reflected by the measurement object (excitation object) passes through the same route to reach the ¼ wavelength plate. By the ¼ wavelength plate, the measurement light is converted from the circularly polarized light into the linearly polarized light, and the linearly polarized measurement light is returned through the second optical path to the heterodyne laser Doppler measurement device.

Embodiments

Hereinafter, embodiments according to the present invention are described in detail.

Figure 1:
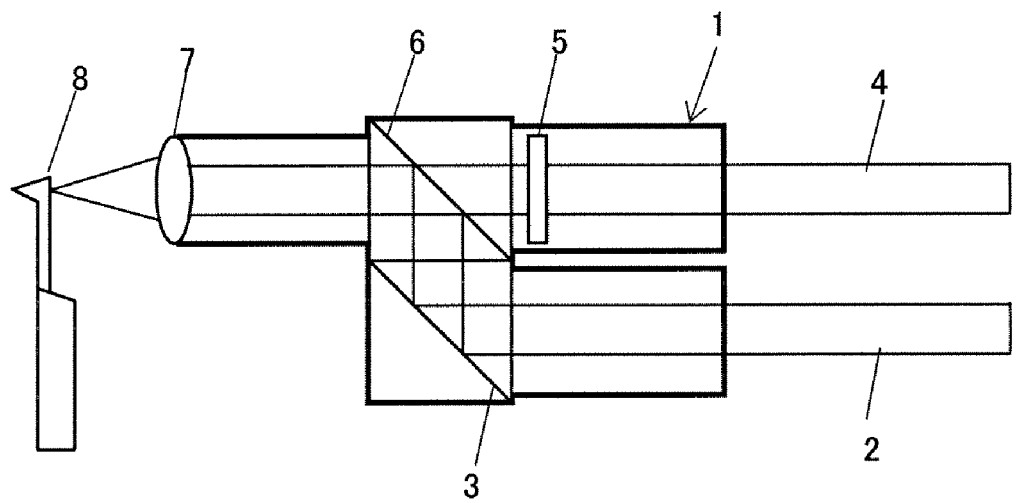
FIG. 1 is a schematic diagram of a heterodyne laser Doppler probe (basic type) according to an embodiment of the present invention.

FIG. 1 is a schematic diagram of a heterodyne laser Doppler probe (basic type) according to an embodiment of the present invention.

As shown in FIG. 1, reference numeral 1 denotes an optical probe (main body of heterodyne laser Doppler probe), 2 denotes a first optical path for photoexcitation introduced into the optical probe 1, 3 denotes a reflection mirror for receiving light (excitation light) for photoexcitation introduced by the first optical path 2, 4 denotes a second optical path for heterodyne laser Doppler measurement (speed measurement) introduced into the optical probe 1, 5 denotes a ¼ wavelength plate arranged in the second optical path, 6 denotes a beam splitter, 7 denotes a focal lens, 8 denotes a measurement object (cantilever in this case). Measurement light introduced by the second optical path 4 is received by the ¼ wavelength plate 5. The beam splitter 6 reflects the excitation light from the reflection mirror 3, and transmits the measurement light from the ¼ wavelength plate 5, as well as transmits the measurement light (signal light) that has been reflected by the measurement object 8 and that has passed through the focal lens 7, to thereby introduce the measurement light into the ¼ wavelength plate 5.

Thus, the heterodyne laser Doppler probe introduces the excitation light for photoexcitation from the first optical path 2 to the optical probe 1 and measurement light for the heterodyne laser Doppler measurement from the second optical path 4 to the optical probe 1. After emission from the first optical path 2, the excitation light is introduced through the reflection mirror 3 and the beam splitter 6 into the focal lens 7, and then into the measurement object (excitation object) 8. On the other hand, the measurement light for the heterodyne laser Doppler measurement is emitted from the second optical path 4 and passes through the ¼ wavelength plate 5. Here, linearly polarized light is converted into a circularly polarized light and introduced through the beam splitter 6 and the focal lens 7 into the measurement object (excitation object) 8. The measurement light reflected by the measurement object (excitation object) 8 passes through the same route to reach the ¼ wavelength plate 5. By the ¼ wavelength plate 5, the measurement light is converted from the circularly polarized light into the linearly polarized light, and the linearly polarized measurement light is returned through the second optical path 4 to the heterodyne laser Doppler measurement device (not shown).

Figure 2:
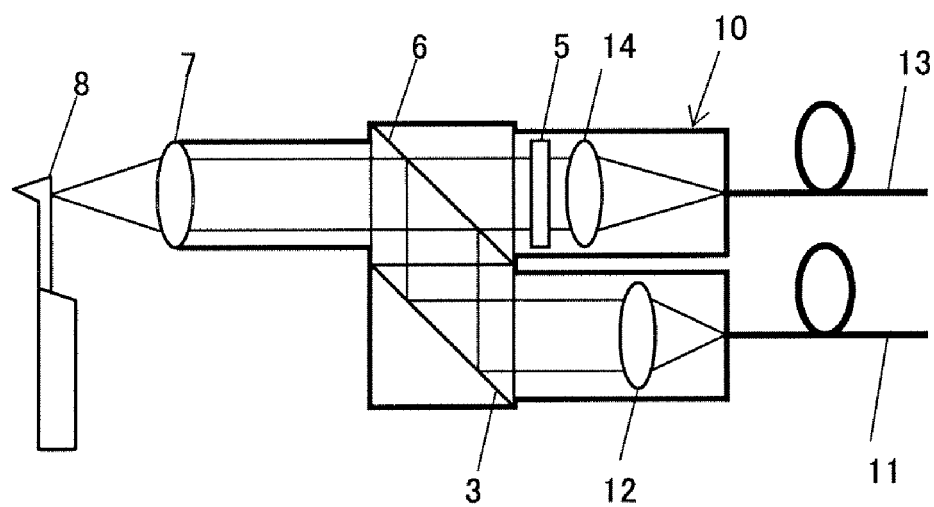
FIG. 2 is a schematic diagram of a heterodyne laser Doppler probe (first modification) according to the above embodiment of the present invention.

FIG. 2 is a schematic diagram of a heterodyne laser Doppler probe (first modification) of the embodiment of the present invention. The same parts as those in FIG. 1 are designated by the same reference numerals, and explanations thereof are omitted.

In this embodiment, instead of performing light propagation using the first optical path 2 and the second optical path 4 shown in FIG. 1, a first optical fiber 11 and a second optical fiber 13 that are each suitable for individual wavelengths, are used. Also, in the optical probe (main body of heterodyne laser Doppler probe) 10, there are provided a first collimator lens 12 that receives excitation light introduced from the first optical fiber 11, and a second collimator lens 14 that receives measurement light from the second optical fiber 13 and that leads out the measurement light (signal light) reflected by the measurement object 8.

Thus, the excitation light introduced by the first optical fiber 11 is introduced through the first collimator lens 12 into the reflection mirror 3. On the other hand, the measurement light introduced by the second optical fiber 13 passes through the ¼ wavelength plate 5 via the second collimator lens 14. Here, linearly polarized light is converted into circularly polarized light and introduced through the beam splitter 6-focal lens 7 into the measurement object (cantilever) 8. The measurement light (signal light) reflected by the measurement object (cantilever) 8 passes through the same route to reach the ¼ wavelength plate 5. By the ¼ wavelength plate 5, the measurement light is converted from the circularly polarized light into the linearly polarized light. Then, the linearly polarized light is made incident on the second optical fiber 13 via the second collimator lens 14, and returned through the second optical path 13 to the heterodyne laser Doppler measurement device (not shown).

Figure 3:
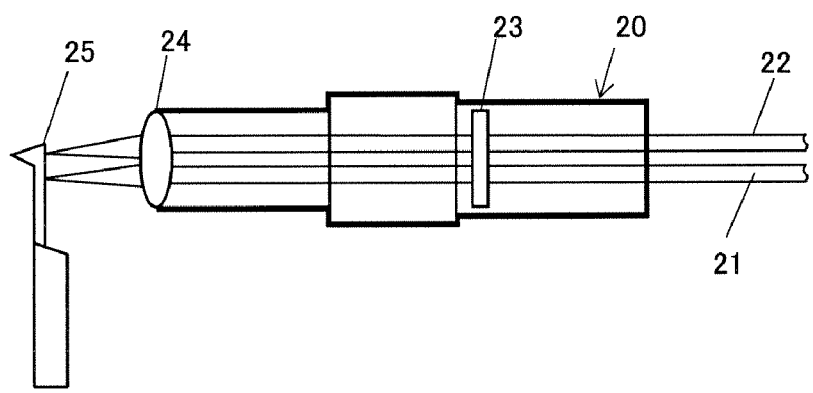
FIG. 3 is a schematic diagram of a heterodyne laser Doppler probe (second modification) according to the above embodiment of the present invention.

FIG. 3 is a schematic diagram of a heterodyne laser Doppler probe (second modification) according to the above embodiment of the present invention.

In FIG. 3, reference numeral 20 denotes an optical probe (main body of heterodyne laser Doppler probe), 21 denotes a first optical path for guiding the excitation light, 22 denotes a second optical path for guiding the measurement light, 23 denotes a ¼ wavelength plate, 24 denotes a focal lens, and 25 denotes a measurement object (cantilever).

In this embodiment, the first optical path 21 and the second optical path 22 are introduced into the ¼ wavelength plate 23 from substantially the same place and direction, and the optical probe 20 is allowed to be disposed in a vacuum or a liquid.

Figure 4:
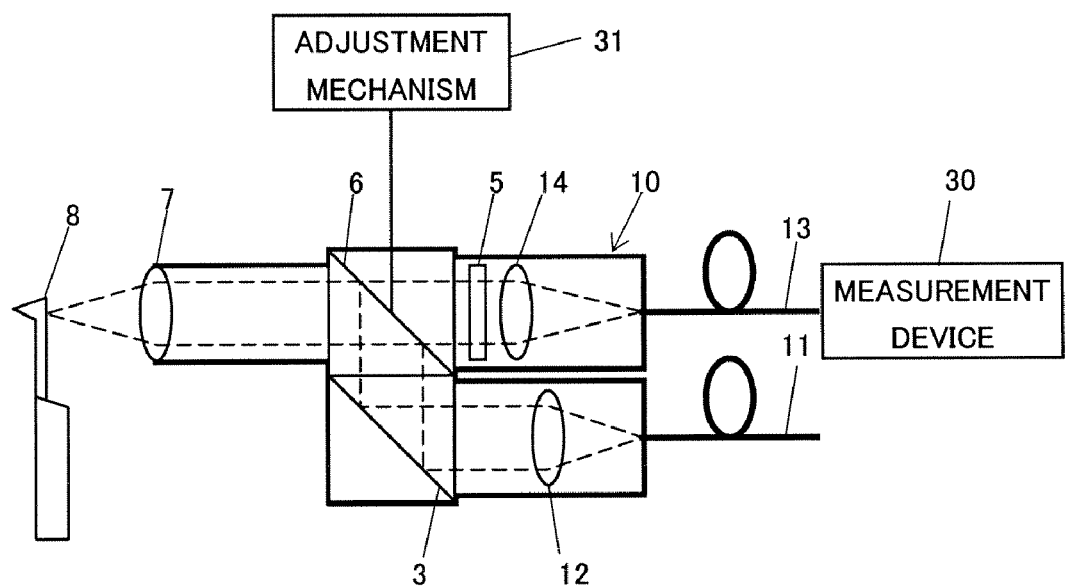
FIG. 4 is a schematic diagram (1) of a heterodyne laser Doppler probe according to a second embodiment of the present invention.
Figure 5:
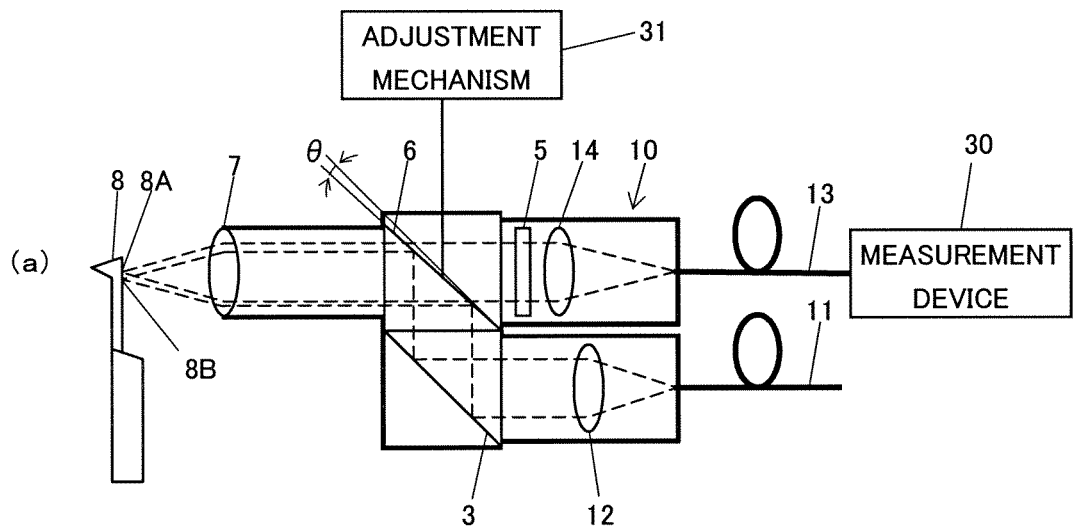
FIG. 5 is a schematic diagram showing an adjustment mode of a beam splitter of the heterodyne laser Doppler probe shown in FIG. 4.
Figure 5:
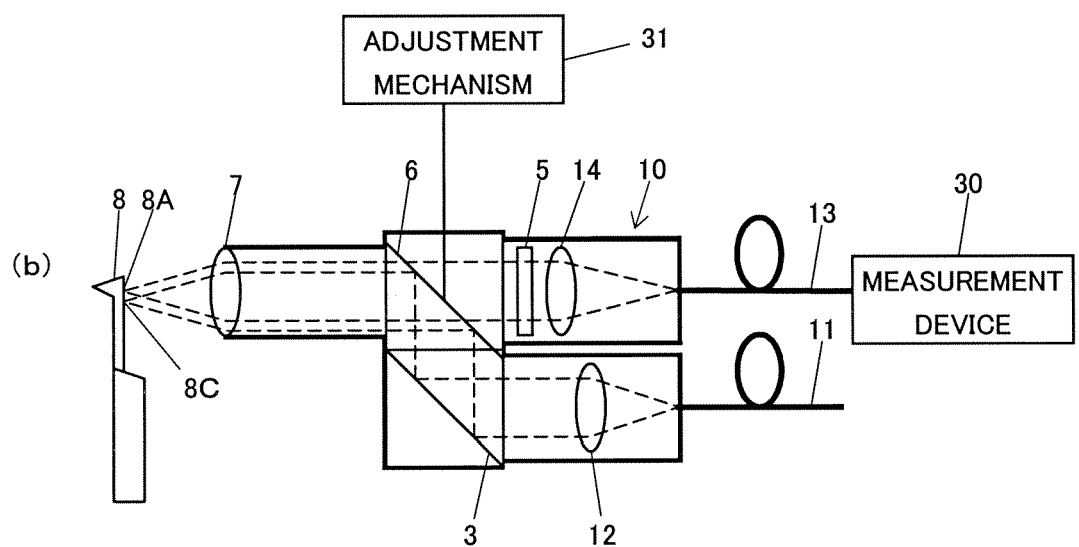

FIG. 4 is a schematic diagram (1) of a heterodyne laser Doppler probe according to a second embodiment of the present invention, and FIG. 5 is a diagram showing an adjustment mode of the beam splitter thereof.

In this embodiment, there is provided an adjustment mechanism 31 for displacing the beam splitter 6 shown in the above-described embodiment (FIG. 2).

As shown in FIG. 5(*a*), when the angle of the beam splitter 6 is moved by θ by the adjustment mechanism 31, the irradiation position 8A of the measurement light on the cantilever 8 does not change because the measurement light passing through the beam splitter 6 from the ¼ wavelength plate 5 is subjected to no influence by the above-described movement of the angle. However, regarding the excitation light that has been reflected by the reflection mirror 3 and further by the beam splitter 6, the irradiation position on the cantilever 8 shifts from 8A to 8B according to the displacement (angle) of the beam splitter 6.

Moreover, as shown in FIG. 5(*b*), when the position of the beam splitter 6 is slid by the adjustment mechanism 31, the irradiation position 8A of the measurement light on the cantilever 8 does not change because the measurement light passing through the beam splitter 6 from the ¼ wavelength plate 5 is subjected to no influence by the sliding of the beam splitter 6. However, regarding the excitation light that has been reflected by the reflection mirror 3 and further by the beam splitter 6, the irradiation position on the cantilever 8 shifts from 8A to 8C according to the displacement (position) of the beam splitter 6.

In this manner, it is possible to adjust the irradiation position of the excitation light alone. In particular, the excitation light allows to enlarge warp (deflection) of the cantilever 8 as the irradiation position thereon approaches closer to the root of the cantilever 8. In contrast, the measurement light allows more precise measurement to be made when it is irradiated closer to a front end side of the cantilever 8.

In this way, the irradiation position of the excitation light on a sample can be adjusted relative to the irradiation position of the measurement light on the sample.

Figure 6:
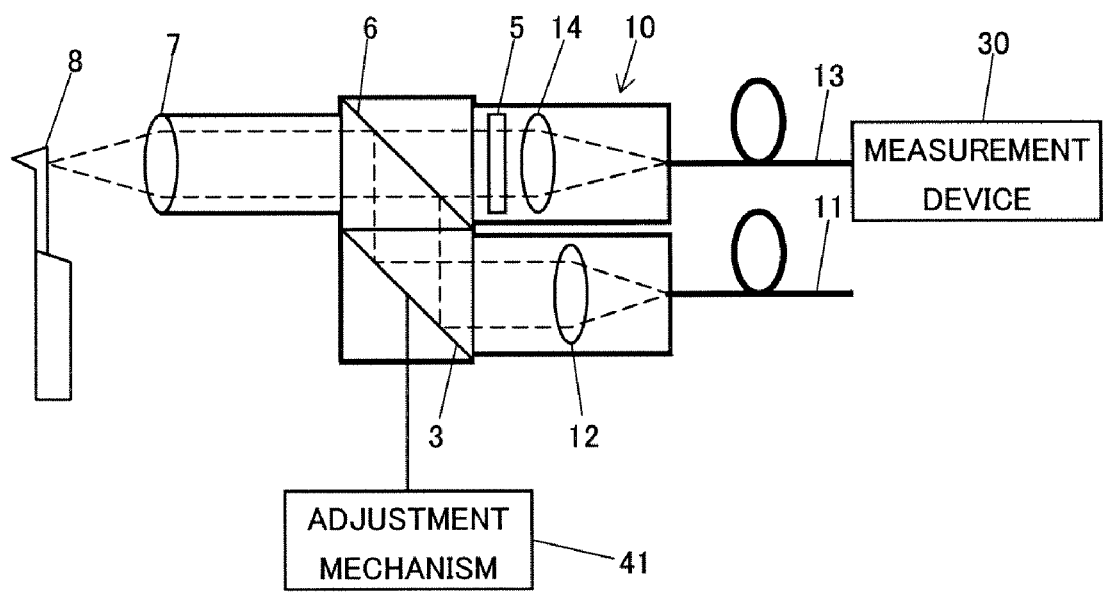
FIG. 6 is a schematic diagram (2) of a heterodyne laser Doppler probe according to the second embodiment of the present invention.
Figure 7:
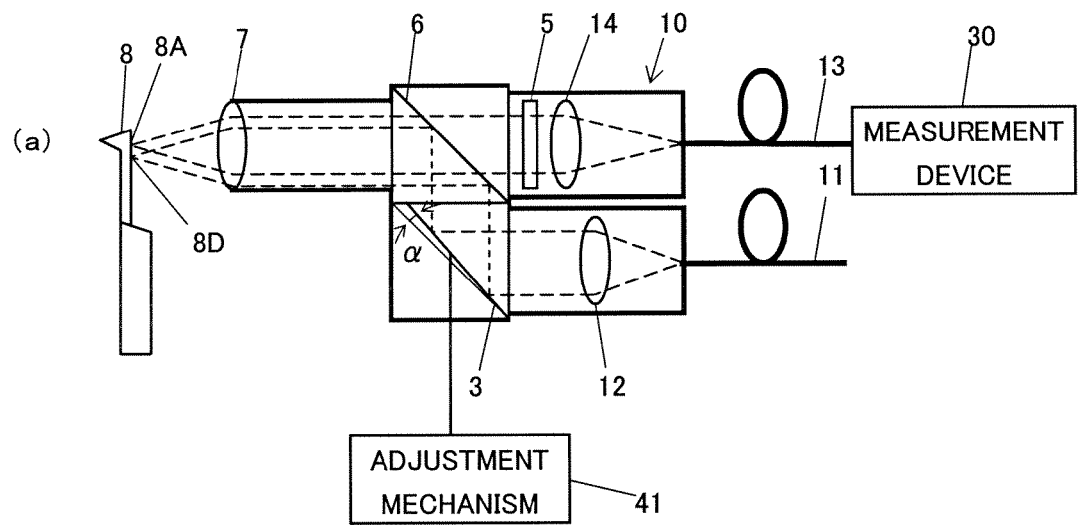
FIG. 7 is a schematic diagram showing an adjustment mode of a reflection mirror of the heterodyne laser Doppler probe shown in FIG. 6.
Figure 7:
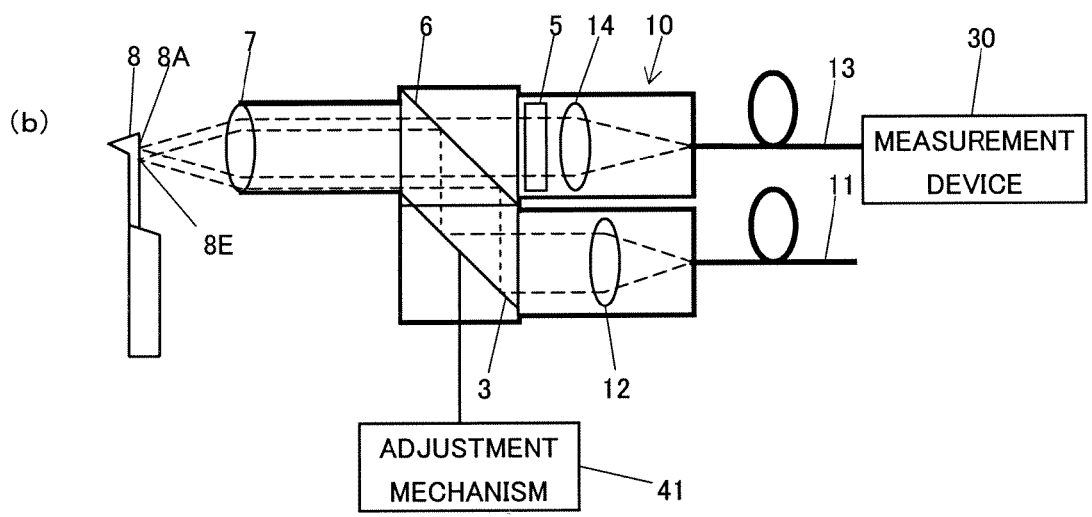

FIG. 6 is a schematic diagram (2) of a heterodyne laser Doppler probe according to the second embodiment of the present invention, and FIG. 7 is a diagram showing an adjustment mode of the reflection mirror thereof.

In this embodiment, there is provided an adjustment mechanism 41 for displacing the reflection mirror 3 shown in the above embodiment.

As shown in FIG. 7(*a*), when the angle of the reflection mirror 3 is moved by a by the adjustment mechanism 41, the irradiation position 8A of the measurement light on the cantilever 8 does not change because the measurement light passing through the beam splitter 6 from the ¼ wavelength plate 5 is subjected to no influence by the above-described movement of the angle. However, regarding the excitation light, the irradiation position on the cantilever 8 shifts from 8A to 8D according to the displacement (angle) of the reflection mirror 3.

Moreover, as shown in FIG. 7(*b*), when the position of the reflection mirror 3 is slid by the adjustment mechanism 41, the irradiation position 8A of the measurement light on the cantilever 8 does not change because the measurement light passing through the beam splitter 6 from the ¼ wavelength plate 5 is subjected to no influence by the sliding of the beam splitter 6. However, regarding the excitation light that has been reflected by the reflection mirror 3 and further by the beam splitter 6, the irradiation position on the cantilever 8 shifts from 8A to 8E according to the displacement (position) of the reflection mirror 3.

In this way, the irradiation position of the excitation light on a sample can be adjusted relative to the irradiation position of the measurement light on the sample.

Here, by combining the adjustment by the displacement of the beam splitter 6 as shown in FIG. 5 and the adjustment by the displacement of the reflection mirror 3 as shown in FIG. 7, the irradiation position of the excitation light on a sample may be precisely adjusted relative to the irradiation position of the measurement light on the sample.

Figure 8:
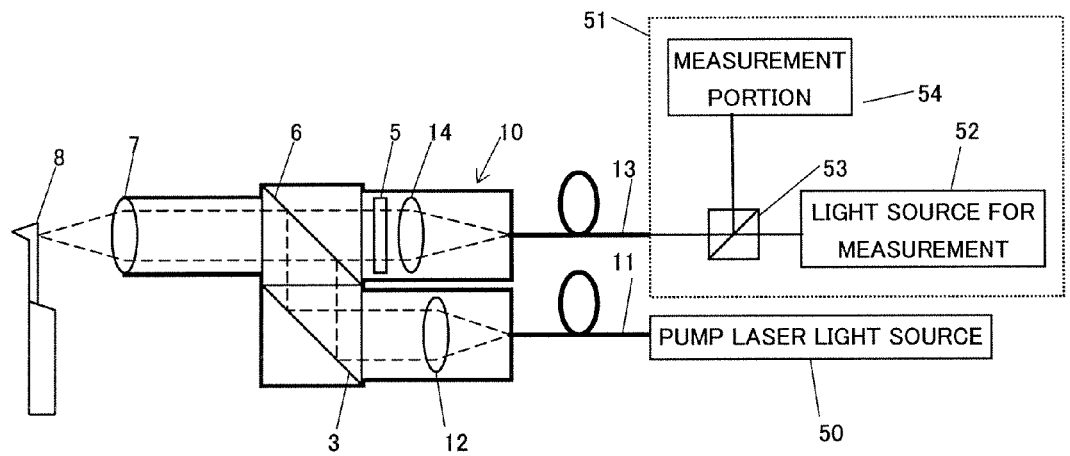
FIG. 8 is a schematic diagram of a measurement system using the heterodyne laser Doppler probe shown in FIG. 2.

FIG. 8 is a schematic diagram of a measurement system using the heterodyne laser Doppler probe shown in FIG. 2.

Here, as a heterodyne laser Doppler probe, the one as shown in FIG. 2 is used. In FIG. 8, reference numeral 50 denotes a pump laser light source (LD), 51 denotes a measurement device, 52 denotes a light source for measurement light, 53 denotes a beam splitter, and 54 denotes a measurement portion (laser Doppler interferometer).

The measurement light (signal light) outputted from the heterodyne laser Doppler probe 10 is captured by the measurement device 51. The measurement light is reflected by the beam splitter 53, and measurement of a speed of the measurement object (excitation object) 8, for example, can be performed at the measurement portion (laser Doppler interferometer) 54.

This measurement system using the heterodyne laser Doppler probe may additionally include the above-described adjustment mechanism, as well.

Figure 9:
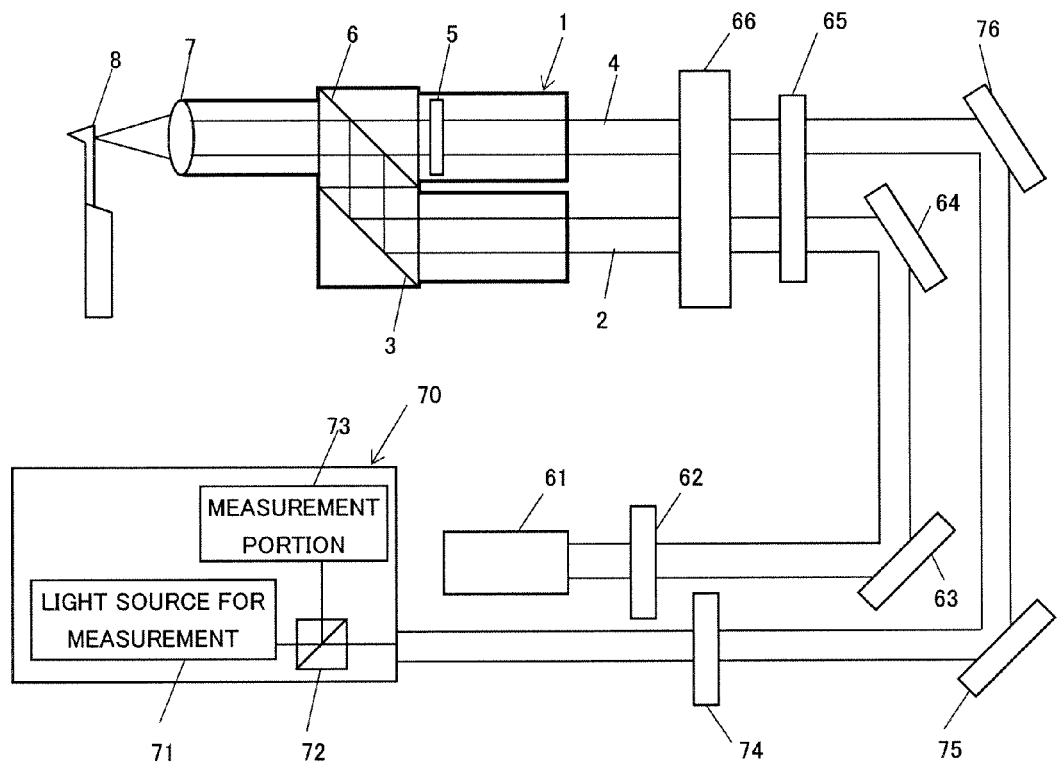
FIG. 9 is a schematic diagram of a measurement system using the heterodyne laser Doppler probe according to a second embodiment of the present invention.

FIG. 9 is a schematic diagram of a measurement system using the heterodyne laser Doppler probe according to a second embodiment of the present invention.

In FIG. 9, as an optical probe, the same one as in the above-described embodiment (FIG. 1) is used.

This embodiment shows a method for adjusting the optical paths to the measurement object (excitation object) 8 from the light source of a measurement device 70 including a light source 71 for measurement light, a beam splitter 72 and a measurement portion (laser Doppler meter), and from a light source 61 for photoexcitation. This allows the excitation light and the measurement light to be each positioned at an intended position with respect to the displacements of the measurement object (excitation object) 8 and the optical probe 1 in x, y, z directions.

The second optical path 4 of the measurement device 70, after having been emitted from a light source 71 of the measurement light, makes a translational displacement using a rotation (with 2-degree-of-freedom tilts) of a second glass plate 74 for optical path adjustment. Then, the optical path is adjusted by a second mirror 75 for optical path adjustment, the second mirror 75 being capable of adjusting two tilt angles. Next, in optical path adjustment by a fourth mirror 76 for optical path adjustment, the parallel displacement of the optical path is adjusted by a third glass plate 65 for optical path adjustment, and thus the second optical path 4 is introduced into the optical probe 1 through a glass barrier (in the case where the optical probe is under a vacuum environment etc.) 66. In the first optical path 2 for photoexcitation, after having been emitted from a light source 61 for photoexcitation, the first optical path 2 passes through a first glass plate 62 for optical path adjustment, a first mirror 63 for optical path adjustment, a third mirror 64 for optical path adjustment and a third glass plate 65 for optical path adjustment, and is introduced into the optical probe 1, through the glass barrier 66 when the optical probe 1 is under a vacuum environment etc. Here, each of the light adjustment mirrors has freedom degrees in the adjustment of translation x, y, z, and two tilt angles, that is, it is capable of adjusting the translational displacement of the path and two tilt freedom degrees. The first optical path 2 and the second optical path 4 are somewhat deviate from the parallel state with respect to each other immediately before their incidences on the optical probe 1, which allows them to focus on different positions on the measurement object (excitation object) 8.

Figure 10:
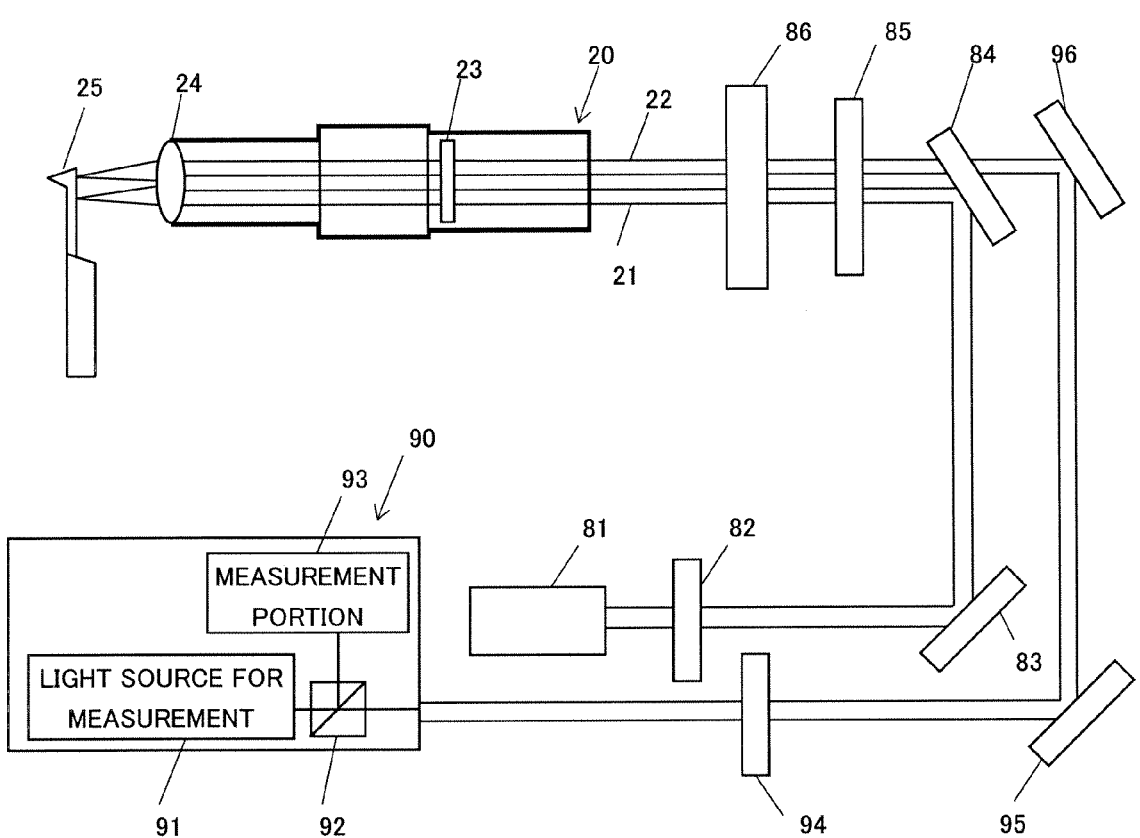
FIG. 10 is a schematic diagram of a measurement system using the heterodyne laser Doppler probe according to a third embodiment of the present invention.

FIG. 10 is a schematic diagram of a measurement system using the heterodyne laser Doppler probe according to a third embodiment of the present invention.

In FIG. 10, as an optical probe, the same one as in the above-described embodiment (FIG. 3) may be used. Here, reference numeral 81 denotes a light source for photoexcitation, 82 denotes a first glass plate for optical path adjustment, 83 denotes a first mirror for optical path adjustment, 84 denotes a third mirror (dichroic mirror) for optical path adjustment, 85 denotes a third glass plate for optical path adjustment, 86 denotes a glass barrier, 90 denotes a measurement device, 91 denotes a light source for measurement light, 92 denotes a beam splitter, 93 denotes a measurement portion (laser Doppler meter), 94 denotes a second glass plate for optical path adjustment, 95 denotes a second mirror for optical path adjustment, and 96 denotes a fourth mirror for optical path adjustment.

In this embodiment, the third mirror 84 for optical path adjustment is a mirror such as a dichroic mirror having wavelength selectivity, the mirror reflecting the first optical path 21, and passing through light in the second optical path 22. The incident positions on the first optical path 21 and the second optical path 22 of the optical probe 20 are arranged to be substantially the same.

As described above, there is provided the glass barrier 66 or 86 in the first and second optical paths 21 and 22. This makes it possible to arrange the optical probe 1 or 20 in a vacuum, a gas, or a liquid, and to dispose the light source or the optical path adjustment mechanism in the air.

The present invention is not limited to the above-described embodiments. Various changes and modifications can be made within the spirit of the present invention, and they are not excluded from the scope of the present invention. According to the present invention, it is possible to perform high-efficiency photoexcitation and speed measurement with respect to the measurement object by providing the first optical path or optical fiber for photoexcitation and the second optical path or optical fiber for measurement.

INDUSTRIAL APPLICABILITY

The heterodyne laser Doppler probe according to the present invention is applicable to the fields of measurement in general, speed measurement, microscopes, substance identification, and nano-biomechanics.

The invention claimed is:

1. A heterodyne laser Doppler probe, comprising:
   (a) a first optical path for guiding excitation light;
   (b) a second optical path for guiding measurement light;
   (c) an optical probe body for optically coupling and structurally combining the first optical path and the second optical path, and including a reflection mirror, a beam splitter, a focal lens and a ¼ wavelength plate,
   wherein the excitation light from the first optical path is introduced through the reflection mirror, the beam splitter and the focal lens into a measurement object, and
   wherein the measurement light from the second optical path passes through the ¼ wavelength plate to be converted from linearly polarized light into circularly polarized light, then introduced through the beam splitter and the focal lens into the measurement object, reflected off the measurement object through the focal lens and the beam splitter into the ¼ wavelength plate to be converted from circularly polarized light into linearly polarized light, and then returned through the second optical path to a heterodyne laser Doppler measurement device.

2. The heterodyne laser Doppler probe according to claim 1,
   wherein the first optical path is a first optical fiber, and the second optical path is a second optical fiber;
   the excitation light from the first optical fiber is introduced through a first collimator lens in the optical probe body into the focal lens, after having been emitted from the first optical fiber; and
   the measurement light from the second optical fiber is introduced through a second collimator lens in the optical probe body into the focal lens, after having been emitted from the second optical fiber.

3. The heterodyne laser Doppler probe according to claim 1 or 2,
   wherein the measurement object is a cantilever; and
   the speed of the cantilever is measured.

4. The heterodyne laser Doppler probe according to claim 1, further comprising an adjustment mechanism capable of displacing the beam splitter, whereby a focal position of the excitation light on the measurement object is adjusted with respect to a focal position of the measurement light on the measurement object.

5. The heterodyne laser Doppler probe according to claim 1, further comprising an adjustment mechanism capable of displacing the reflection mirror, whereby a focal position of the excitation light on the measurement object is adjusted with respect to a focal position of the measurement light on the measurement object.

6. The heterodyne laser Doppler probe according to claim 1, further comprising an adjustment mechanism capable of displacing the beam splitter and the reflection mirror, whereby a focal position of the excitation light on the measurement object is adjusted with respect to a focal position of the measurement light on the measurement object.

7. A measurement system using the heterodyne laser Doppler probe according to claim 1, wherein the measurement light that has been emitted from the second optical path and reflected by the measurement object is reflected by the beam splitter, to thereby introduce the measurement light reflected by the beam splitter into a measurement portion.

8. The measurement system using the heterodyne laser Doppler probe according to claim 7, wherein by mirrors for optical path adjustment arranged in the first and second optical paths, the excitation light and the measurement light are introduced into the optical probe body in a superimposed manner.

9. The measurement system using the heterodyne laser Doppler probe according to claim 7 or 8, wherein a glass barrier is arranged in the first and second optical paths, whereby the optical probe body is allowed to be disposed in a vacuum, a gas, or a liquid, and a light source or an optical path adjustment mechanism is allowed to be disposed in the air.

* * * * *